US 12,496,867 B2

(12) United States Patent
Randall et al.

(10) Patent No.: US 12,496,867 B2
(45) Date of Patent: Dec. 16, 2025

(54) HYDRAULICALLY-ADJUSTABLE PRELOAD AND/OR CROSS-OVER

(71) Applicant: Fox Factory, Inc., Duluth, GA (US)

(72) Inventors: Connor Randall, Salida, CO (US); Regan Woelfel, Scotts Valley, CA (US)

(73) Assignee: Fox Factory, Inc., Duluth, GA (US)

( * ) Notice: Subject to any disclaimer, the term of this patent is extended or adjusted under 35 U.S.C. 154(b) by 648 days.

(21) Appl. No.: 17/507,357

(22) Filed: Oct. 21, 2021

(65) Prior Publication Data
US 2022/0041029 A1  Feb. 10, 2022

Related U.S. Application Data (63) Continuation-in-part of application No. 17/185,691, filed on Feb. 25, 2021, now Pat. No. 11,840,120, and
(Continued)

(51) Int. Cl.
*B60G 17/08* (2006.01)
*B60G 13/08* (2006.01)
*F15B 15/14* (2006.01)

(52) U.S. Cl.
CPC .......... *B60G 17/08* (2013.01); *F15B 15/1447* (2013.01); *B60G 13/08* (2013.01);
(Continued)

(58) Field of Classification Search
CPC .... B60G 17/08; B60G 13/08; B60G 2202/24; B60G 2500/30; B60G 15/063; B60G 15/065; B60G 11/16; F15B 15/1447
See application file for complete search history.

(56) References Cited

U.S. PATENT DOCUMENTS 2,620,182 A   12/1952   Wilson et al.
3,306,599 A    2/1967   Stanislas
(Continued)

FOREIGN PATENT DOCUMENTS

EP   2902222 A1   8/2015
EP   3597458 A1   1/2020
(Continued)

OTHER PUBLICATIONS

Extended European Search Report for EP Application 21160085.3, dated Aug. 6, 2021, 6 pages.
(Continued)

*Primary Examiner* — Drew J Brown (57) ABSTRACT

A modular hydraulically-adjustable preload and/or cross-over system. The system includes a housing configured to couple with a main damper cylinder, the housing including a slave cylinder within a portion of a slave cylinder chamber, the slave cylinder telescopically movable with respect to the housing; a fluid chamber; and a fluid port configured to provide a fluid flow for the fluid chamber, wherein an increase in a fluid volume within the fluid chamber causes a portion of the slave cylinder to telescopically extend from the slave cylinder chamber. A preload flange coupled with the slave cylinder at an end of the housing such that a change in a location of the slave cylinder causes a change in a location of the preload flange.

19 Claims, 9 Drawing Sheets

Related U.S. Application Data a continuation-in-part of application No. 17/185,766, filed on Feb. 25, 2021, now Pat. No. 11,718,137.

(60) Provisional application No. 63/110,204, filed on Nov. 5, 2020, provisional application No. 63/105,796, filed on Oct. 26, 2020, provisional application No. 62/982,645, filed on Feb. 27, 2020, provisional application No. 62/982,629, filed on Feb. 27, 2020.

(52) U.S. Cl.
CPC ...... *B60G 2202/24* (2013.01); *B60G 2206/41* (2013.01); *B60G 2500/10* (2013.01); *B60G 2500/30* (2013.01); *B60G 2800/162* (2013.01)

(56) References Cited

U.S. PATENT DOCUMENTS

| | | | |
|---|---|---|---|
| 3,603,610 A * | 9/1971 | Thompson | B60G 17/0272 267/221 |
| 3,847,410 A | 11/1974 | Keijzer et al. | |
| 3,986,118 A | 10/1976 | Madigan | |
| 4,159,105 A * | 6/1979 | Vander Laan | B62K 25/04 137/630.2 |
| 4,720,085 A | 1/1988 | Shinbori et al. | |
| 4,830,395 A * | 5/1989 | Foley | B60G 17/0272 280/124.162 |
| 4,858,898 A | 8/1989 | Niikura et al. | |
| 5,009,451 A | 4/1991 | Hayashi et al. | |
| 5,096,168 A * | 3/1992 | Takehara | F16F 9/185 267/152 |
| 5,263,695 A | 11/1993 | Bianchi | |
| 5,351,790 A | 10/1994 | Machida | |
| 5,477,948 A * | 12/1995 | Stevens | B60G 17/021 267/221 |
| 5,952,823 A | 9/1999 | Sprecher et al. | |
| 6,264,212 B1 | 7/2001 | Timoney | |
| 6,676,119 B2 | 1/2004 | Becker et al. | |
| 6,827,184 B1 * | 12/2004 | Lin | B60G 11/15 267/221 |
| 7,374,028 B2 | 5/2008 | Fox | |
| 7,413,063 B1 * | 8/2008 | Davis | H01F 1/447 188/267.1 |
| 8,480,064 B2 | 7/2013 | Talavasek | |
| 8,627,932 B2 | 1/2014 | Marking | |
| 8,857,580 B2 | 10/2014 | Marking | |
| 9,033,122 B2 | 5/2015 | Ericksen et al. | |
| 9,114,846 B1 | 8/2015 | Ishikawa et al. | |
| 9,120,362 B2 | 9/2015 | Marking | |
| 9,162,548 B1 | 10/2015 | Wakeman | |
| 9,239,090 B2 | 1/2016 | Marking et al. | |
| 9,248,717 B2 * | 2/2016 | Cox | B60G 17/0152 |
| 9,353,818 B2 | 5/2016 | Marking | |
| 9,422,025 B2 | 8/2016 | Pezzi et al. | |
| 9,821,621 B2 | 11/2017 | Mason | |
| 9,834,058 B2 | 12/2017 | Seminara et al. | |
| 10,094,443 B2 | 10/2018 | Marking | |
| 10,328,764 B2 | 6/2019 | Murakami et al. | |
| 10,434,835 B2 | 10/2019 | Six et al. | |
| 10,654,331 B2 | 5/2020 | Murakami et al. | |
| 10,919,597 B2 | 2/2021 | Murakami et al. | |
| 10,933,710 B2 | 3/2021 | Tong | |
| 2001/0032462 A1 * | 10/2001 | Beck | F16F 9/064 60/477 |
| 2005/0173213 A1 | 8/2005 | Coquet | |
| 2006/0289258 A1 | 12/2006 | Fox | |
| 2009/0302559 A1 | 12/2009 | Doerfel | |
| 2010/0140884 A1 | 6/2010 | Runkel | |
| 2010/0308518 A1 * | 12/2010 | Michel | F16F 1/121 267/225 |
| 2011/0024957 A1 | 2/2011 | Nagai | |
| 2011/0101632 A1 | 5/2011 | Mochizuki | |
| 2011/0227301 A1 | 9/2011 | Nagai et al. | |
| 2011/0298168 A1 | 12/2011 | Groebner | |
| 2012/0007327 A1 | 1/2012 | Talavasek | |
| 2012/0325605 A1 | 12/2012 | Talavasek et al. | |
| 2013/0200589 A1 | 8/2013 | Cox | |
| 2014/0077466 A1 | 3/2014 | Murakami et al. | |
| 2014/0353893 A1 | 12/2014 | Cox | |
| 2015/0097323 A1 | 4/2015 | Awasa | |
| 2015/0239526 A1 | 8/2015 | Ishikawa et al. | |
| 2017/0057591 A1 | 3/2017 | Bender et al. | |
| 2017/0080771 A1 | 3/2017 | Kirchner et al. | |
| 2017/0274976 A1 | 9/2017 | Yoshida | |
| 2018/0215230 A1 * | 8/2018 | Mochizuki | B60G 17/0272 |
| 2019/0101178 A1 | 4/2019 | Skognes et al. | |
| 2019/0105958 A1 * | 4/2019 | Mochizuki | B62K 25/10 |
| 2019/0203798 A1 | 7/2019 | Cox et al. | |
| 2020/0223274 A1 * | 7/2020 | Tucker | B60G 11/56 |
| 2020/0324852 A1 | 10/2020 | Kwaterski et al. | |
| 2020/0378168 A1 | 12/2020 | Chen | |
| 2021/0033163 A1 | 2/2021 | Nakano et al. | |
| 2021/0033164 A1 | 2/2021 | Barefoot et al. | |
| 2022/0403909 A1 | 12/2022 | Laird et al. | |

FOREIGN PATENT DOCUMENTS

| | | |
|---|---|---|
| WO | 2013066159 A1 | 5/2013 |
| WO | 2022074578 A1 | 4/2022 |

OTHER PUBLICATIONS

Extended European Search Report for EP Application 21160101.8, dated Aug. 5, 2021, 7 pages.

* cited by examiner

HYDRAULICALLY-ADJUSTABLE PRELOAD AND/OR CROSS-OVER

CROSS-REFERENCE TO RELATED APPLICATIONS

This application claims priority to and benefit of co-pending U.S. Provisional Patent Application No. 63/105,796 filed on Oct. 26, 2020, entitled "MODULAR HYDRAULICALLY-ADJUSTABLE PRELOAD AND/OR CROSS-OVER" by Randall et al., and assigned to the assignee of the present application, the disclosure of which is hereby incorporated by reference in its entirety.

This application is a Continuation-in-Part and claims priority to and benefit of co-pending U.S. patent application Ser. No. 17/185,691, filed on Feb. 25, 2021, entitled "IFP SHOCK WITH AUTOMATICALLY ADJUSTABLE RIDE HEIGHT" by Connor Randall, and assigned to the assignee of the present application, the disclosure of which is hereby incorporated by reference in its entirety.

The application Ser. No. 17/185,691 claims priority to and benefit of U.S. Provisional Patent Application No. 62/982,645, filed on Feb. 27, 2020, entitled "AN IFP SHOCK WITH AUTOMATICALLY ADJUSTABLE RIDE HEIGHT" by Connor Randall, and assigned to the assignee of the present application, the disclosure of which is hereby incorporated by reference in its entirety.

This application is a Continuation-in-Part and claims priority to and benefit of co-pending U.S. patent application Ser. No. 17/185,766 filed on Feb. 25, 2021, entitled "SHOCK ASSEMBLY WITH AUTOMATICALLY ADJUSTABLE RIDE HEIGHT" by Nick D'Orazio et al., and assigned to the assignee of the present application, the disclosure of which is hereby incorporated by reference in its entirety.

The application Ser. No. 17/185,766 claims priority to and benefit of co-pending U.S. Provisional Patent Application No. 63/110,204, filed on Nov. 5, 2020, entitled "A SHOCK WITH POPPET CONFIGURED AUTOMATICALLY ADJUSTABLE RIDE HEIGHT" by Connor Randall et al., and assigned to the assignee of the present application, the disclosure of which is hereby incorporated by reference in its entirety.

The application Ser. No. 17/185,766 claims priority to and benefit of U.S. Provisional Patent Application No. 62/982,629, filed on Feb. 27, 2020, entitled "A SHOCK WITH AUTOMATICALLY ADJUSTABLE RIDE HEIGHT" by Nick D'Orazio et al., and assigned to the assignee of the present application, the disclosure of which is hereby incorporated by reference in its entirety.

INCORPORATION BY REFERENCE

This application is incorporates by reference U.S. patent application Ser. No. 16/144,819, filed on Sep. 27, 2018, entitled "DAMPER WITH HYDRAULICALLY-ADJUSTABLE PRELOAD AND/OR CROSS-OVER" by Grant Skognes et al., assigned to the assignee of the present application, and is hereby incorporated by reference herein in their entireties and made a part of the present specification.

FIELD OF THE INVENTION

Embodiments of the present technology relate generally to a damper including a coil spring or a plurality of coil springs, wherein the coil spring, or the plurality of coil springs, affects the damping characteristics of the damper.

BACKGROUND

Certain shock absorbers utilize a coil spring or a plurality of coil springs to affect operating characteristics of the damper. Typically, to vary the operating characteristics of the damper, manual adjustments are made by a user of the damper directly at the location of the coil spring or the plurality of coil springs. Such manual adjustments can be difficult and sometimes dangerous to perform. Additionally, in a multi-wheeled vehicle, the user may be required to make such manual adjustments to each damper (or set of dampers) located at each wheel of the multi-wheeled vehicle.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

A suspension system for a vehicle provides a motion modifiable connection between a portion of the vehicle that is in contact with a surface and some or all of the rest of the vehicle that is not in contact with the surface. For example, the portion of the vehicle that is in contact with the surface can include one or more wheel(s), skis, tracks, hulls, etc., while some or all of the rest of the vehicle that is not in contact with the surface include suspended portions such as anything on a frame, a seat, handlebars, engines, cranks, etc.

At the basic level, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

As vehicle utilization scenarios change, one or more shock assemblies of the suspension system can be adjusted for different characteristics based on the use type of the vehicle, terrain, purpose (e.g., rock crawl, normal use, race set-up, etc.), and the like. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its SAG setting as quickly as possible in preparation for the next encounter.

In contrast, a street bike racer (track racing vehicle, boat/PWC racer, etc.) would want a firmer suspension configuration with a very small range of motion to provide feel for the grip of the tire, maintain friction and/or aerodynamic geometries, and the like, in order to obtain the maximum performance from the vehicle.

In a normal use scenario, such as a trip to the local store, a ride around town or on a path, a drive to grandma's house, a boat ride out on a lake, etc., one choice for the suspension configuration would be based on providing the most comfort.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a ride/drive from a paved road to an off-road environment (or vice-versa) would also be a time when a change to one or more suspension component settings is valuable to reduce the opportunity for bottom out or other types of reduced performance.

In general, the term initial SAG settings or "SAG" refers to a pre-defined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the vehicle manufacturer. The SAG can then be modified and/or adjusted by an owner, a mechanic, or the like. For example, an owner can modify the SAG to designate a new normal ride height based on a vehicle use purpose, load requirements that are different than the factory load configuration, an adjustment, modification, and/or replacement of one or more of the suspension components, a change in tire size, a performance adjustment, aesthetics, and the like. Additional information regarding SAG and SAG setup can be found in U.S. Pat. No. 8,838,335 which is incorporated by reference herein, in its entirety.

Embodiments disclosed herein, provide a hydraulically-adjustable preload and/or crossover system that is placed about the outside of a damper body to provide preload and/or crossover adjustability. In one embodiment, the hydraulically-adjustable preload and/or crossover system is modular. In one embodiment, the modular hydraulically-adjustable preload and/or crossover system is placed about the outside of an existing damper body to provide previously unavailable preload and/or crossover adjustability for the existing damper body. In one embodiment, the hydraulically-adjustable preload and/or crossover system discussed herein are used on dampers in power sports applications such as motorcycles, all-terrain vehicles (ATV), Side-by-Sides, utility vehicles (UTV), snowmobiles, scooters, recreational off-highway vehicles (ROV), multipurpose off-highway utility vehicles (MOHUV), personal watercrafts (PWC), and the like. However, it should be appreciated that the hydraulically-adjustable preload and/or crossover system can be used with almost any single spring or multi spring damper.

In one embodiment, the system is a modular system that can be coupled with existing damper bodies. In one embodiment, the modular design allows for different spring preload flange designs depending on the use case. For example, in a multi-spring damper embodiment, the damper initially gets the lower spring rate using both the tender and the primary spring. Then, during a compression stroke, when the spring coupler comes into contact with the crossover ring the spring rate will become the primary spring rate. Because of the capability of hydraulically-adjustable preload and/or crossover system to adjust a dual spring system in conjunction with the crossover, embodiments described herein also provide additional help to prevent bottom out.

Figure 1A:
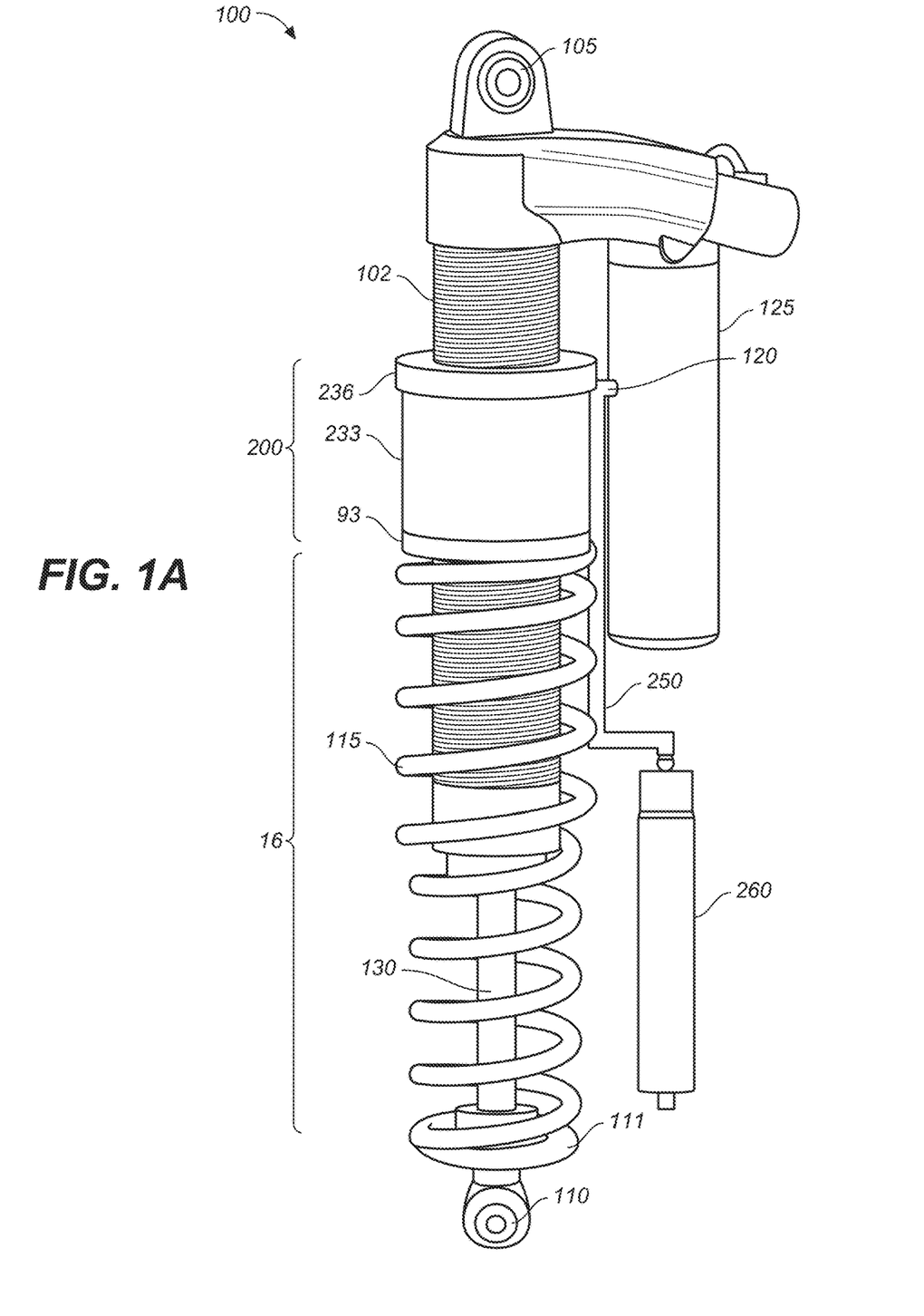
FIG. 1A is a perspective view of a single spring damper with a hydraulically-adjustable preload and/or crossover system, shown in accordance with an embodiment.

Referring now to FIG. 1A, a perspective view of a single spring damper 100 with a modular hydraulically-adjustable preload and/or crossover system 200 is shown in accordance with an embodiment. In one embodiment, the hydraulically-adjustable preload and/or crossover system 200 disclosed herein is modular such that it can be added to one or more dampers in an assortment of vehicles such as, but not limited to a bicycle, motorcycle, ATV, jet ski, car, snow mobile, side-by-side, and the like.

Damper 100 includes a main damper cylinder 102 and a damping piston coupled to a damping rod 130. The damping piston and damping rod 130 can be moved axially into and out of main damper cylinder 102. In one embodiment, damper 100 includes an optional external reservoir 125 having a floating piston and pressurized gas to compensate for a reduction in volume in the main damper chamber of the damper as the damping rod 130 moves into the damper body. Fluid communication between the main chamber of the damper and the external reservoir 125 may be via a flow channel including an adjustable needle valve. In its basic form, the damper works in conjunction with the helical spring and controls the speed of movement of the damping rod by metering incompressible fluid from one side of the damper piston to the other, and additionally from the main chamber to the reservoir, during a compression stroke (and in reverse during the rebound or extension stroke).

In one embodiment, damper 100 includes a surface feature (e.g., threads, ridges, indents, etc.) formed around a portion of the exterior surface of main damper cylinder 102. In one embodiment, the surface feature is fixedly coupled to main damper cylinder 102 such that it is not moveable with respect to main damper cylinder 102. In one embodiment, the surface feature is formed on main damper cylinder 102 during the manufacture of main damper cylinder 102.

With reference still to FIG. 1A, in one embodiment damper 100 also includes hydraulically-adjustable preload and/or crossover system 200 having a cinch/clocking ring 236, a housing 233, and a preload flange 93 (e.g., spring perch, or the like). In one embodiment, housing 233 includes a slave cylinder therein and preload flange 93 is coupled thereto. In general and as will be described in further detail herein, the slave cylinder can telescopically extend from and retract into hydraulically-adjustable preload and/or crossover system 200. In other words, the slave cylinder and preload flange 93 portion of hydraulically-adjustable preload and/or crossover system 200 extends or retracts with respect to housing 233 in a direction along the axis of main damper cylinder 102 (e.g., parallel with damping rod 130). In so doing, the telescopic extension and/or retraction of the slave cylinder and preload flange 93 can increase and/or decrease the preload.

In one embodiment, instead of using a cinch/clocking ring 236, a retaining or resting feature can be built into (or added to, coupled with, etc.) a body cap portion of main damper cylinder 102. For example, in one embodiment, instead of using a cinch/clocking ring 236, an upper portion of housing 233 would rest up against the body cap of main damper cylinder 102. In one embodiment, instead of using a cinch/clocking ring 236, the upper location of housing 233 would be maintained by a retaining ring. In one embodiment, instead of using a cinch/clocking ring 236, at least a portion of the inner body of housing 233 could be threaded/etc. thereby being adjustably coupled with main damper cylinder 102.

Although a number of different ways of maintaining the location of housing 233 are discussed, it should be appreciated that additional methods such as clips, fasteners, and the like may also be used to maintain the location of housing 233 with respect to main damper cylinder 102. In one embodiment, a portion of housing 233 may be formed as part main damper cylinder 102 such that all of the preload adjustments are performed without moving housing 233 with respect to main damper cylinder 102.

Although a number of different methods and systems for maintaining the location of housing 233 with respect to main damper cylinder 102 have been described herein, for purposes of clarity, the following discussion will utilize the cinch/clocking ring 236 example.

Damper 100 also includes a coil spring 115, and eyelets 105 and 110 for coupling damper 100 with a suspension system. Coil spring 115 is disposed surrounding the external surface of main damper cylinder 102. In the single spring embodiment of FIG. 1A, coil spring 115 has one end abutting preload flange 93 and another end coupled to a lower flange 111 located at a lower portion of damper 100 close to eyelet 110.

In operation, damper 100 is initially configured with a given preload and overall length. The overall length is the distance between eyelet 105 and eyelet 110. The preload is configured by the placement of hydraulically-adjustable preload and/or crossover system 200 (in this example, it is a hydraulically-adjustable preload system without crossover aspects) with respect to the threading of main damper cylinder 102.

In operation, there is more preload when the hydraulically-adjustable preload and/or crossover system 200 is moved closer toward eyelet 110 and less preload when it is moved closer to eyelet 105. In general, hydraulically-adjustable preload and/or crossover system 200 has a minimum length as shown in FIG. 1A when the slave cylinder is at is minimalist extended length from housing 233. The resting length 16 of coil spring 115 applies a pressure to preload flange 93 and lower flange 111 to maintain a length of damping rod 130 extending from main damper cylinder 102 and thus the overall length of damper 100. When the suspension encounters a bump, damper 100 enters a compression stage where the distance between eyelet 105 and 110 is reduced as the length 16 of coil spring 115 is compressed. After the compression stage, damper 100 enters a rebound stage where coil spring 115 provides a pressure on preload flange 93 and lower flange 111 causing the length 16 to return to its resting size.

In one embodiment, hydraulically-adjustable preload and/or crossover system 200 of FIG. 1A includes a pump 260 and a hose 250 which couples pump 260 with a fluid port 120. The operation and detail of which are described in further detail herein. In general, the actuation of hydraulically-adjustable preload and/or crossover system 200 can be performed through a pump 260 building pressure through various techniques such as, but not limited to, a motor turning a lead screw to drive a master piston, a hydraulic pump, using the motor or the hydraulic pump in combination with an accumulator for faster actuation than the motor or the hydraulic pump alone, and the like.

Figure 1B:
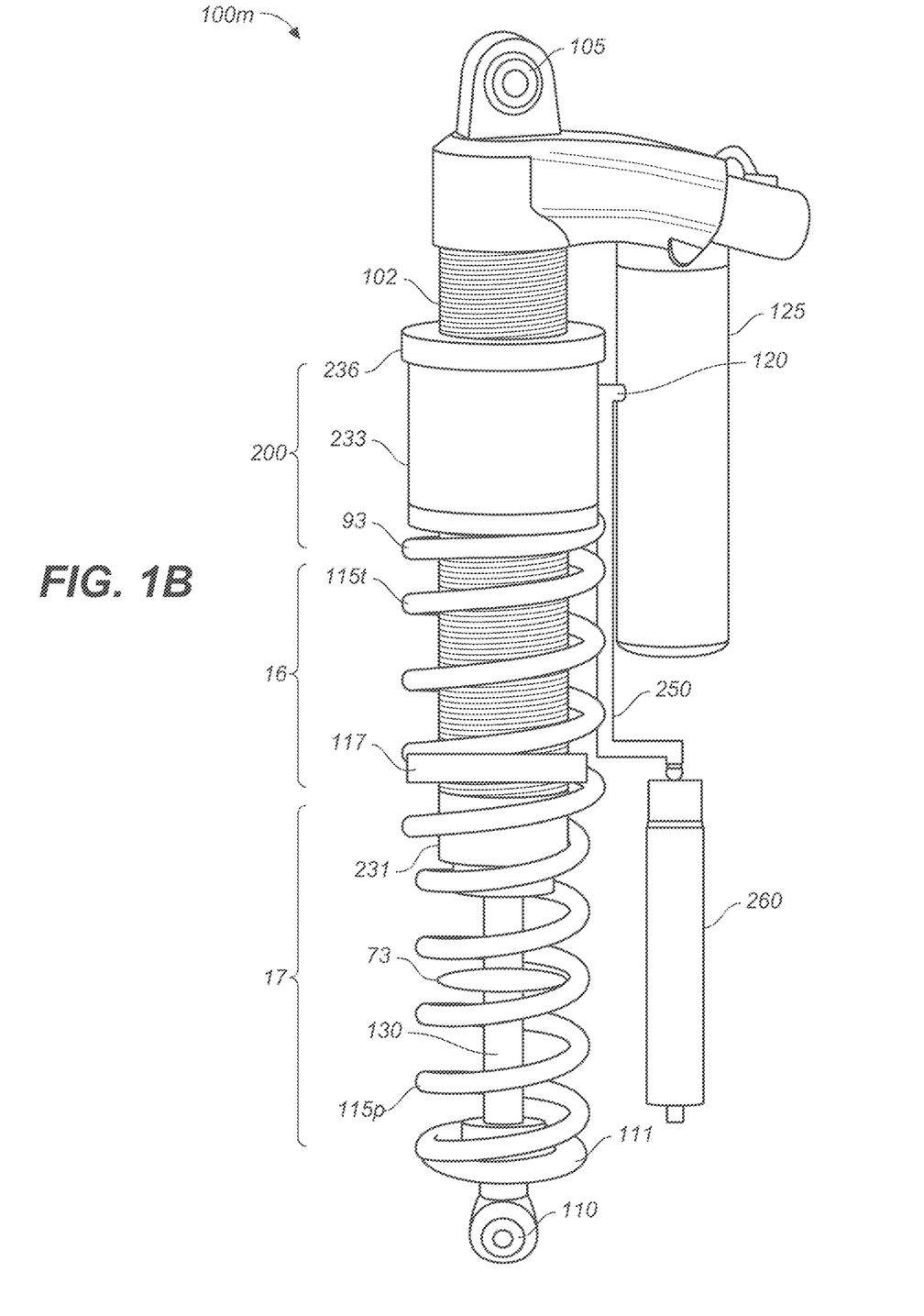
FIG. 1B is a perspective view of a multi spring damper with a hydraulically-adjustable preload and/or crossover system, shown in accordance with an embodiment.

Referring now to FIG. 1B, a perspective view of a multi spring damper 100m with a hydraulically-adjustable preload and/or crossover system 200 is shown in accordance with an embodiment. In the following discussion, the portions of multi spring damper 100m that are similar to those previously described in FIG. 1B will not be repeated for purposes of clarity.

In one embodiment, multi spring damper 100m is a dual-spring damper. However, it should be appreciated that there may be other embodiments that use more than two springs. In the following discussion, for purposes of clarity, there are two springs, e.g., a tender spring 115t and a primary spring 115p. In one embodiment, spring coupler 117 is located between primary spring 115p and tender spring 115t. In one embodiment, tender spring 115t abuts preload flange 93 at one end and spring coupler 117 at the other and has a resting length 16. In one embodiment, primary spring 115p abuts spring coupler 117 at one end and lower flange 111 at the other and has a resting length 17. In one embodiment, multi spring damper 100m includes a stop ring 73.

In general, a dual-spring damper enables multi spring damper 100m to have an initial lighter stiffness rate for regular operation, but will transition to a harder stiffness rate upon encounter of a compression causing event. For example, the initial stiffness of multi spring damper 100m will be soft. As the multi spring damper 100m compresses, so will the primary spring 115p and tender spring 115t, until a point where the crossover 231 will be stopped by the stop ring 73. In general, stop ring 73 is located at a point before tender spring 115t is fully compressed. Once the stop ring 73 meets crossover 231, tender spring 115t is no longer part of the spring stiffness calculation and the rest of the spring compression is placed on primary spring 115p. At that time, the spring rate is increased to the spring stiffness of primary spring 115p.

In general, in a multi spring damper, the two springs are stacked together and provide a modified initial spring rate. The modified initial spring rate is often defined by (tender spring rate*primary spring rate) divided by (tender spring rate+primary spring rate).

For example, if the tender spring rate is 150 and the primary spring rate is 200, the initial spring rate is (150*200)/(150+200) or 86. This will be the spring rate until the stop ring 73 meets the crossover 231. At that time, the spring rate will change to the primary spring rate of 200. In one embodiment, this is identified by a dual rate: 86/200.

In general, by adjusting the crossover 231 location with respect to stop ring 73, the length of the damper stroke at the first spring rate is defined. For example, if a damper has a 12 inch stroke and the crossover 231 is set at 6" of stroke, the damper will use the lighter spring rate (E.g., 86) for the first 6 inches of travel and then transition to the heavier spring rate (e.g., 200) for any remaining compression.

Thus, as different terrain is encountered, the ability to adjust the location of crossover 231 (and thus the length), is important to damper performance, ride quality, and possibly component or system damage.

Figure 2A:
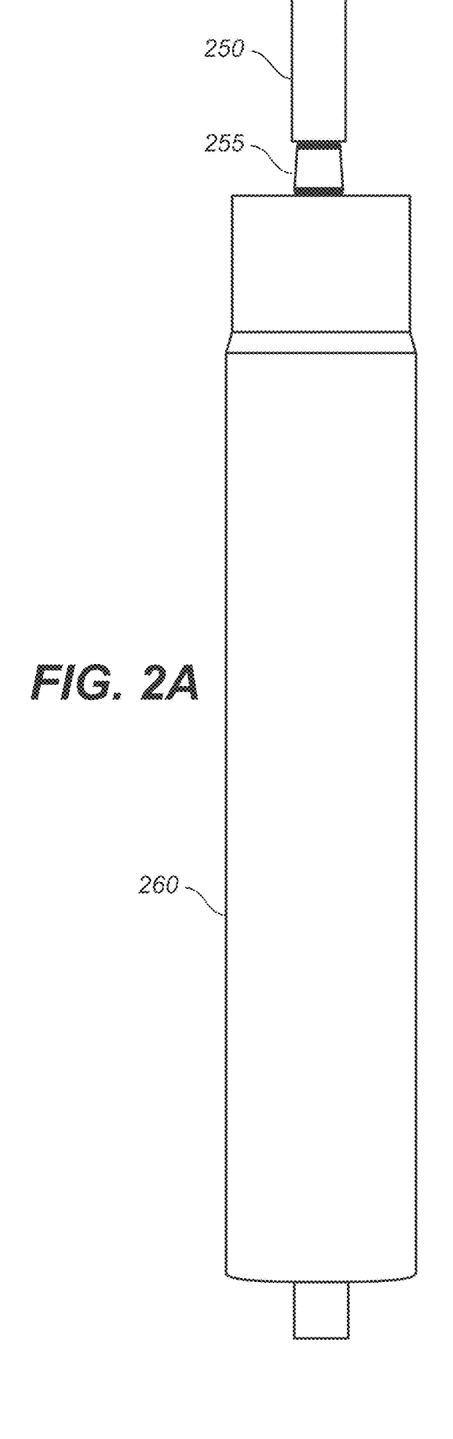
FIG. 2A is a perspective view of a hydraulic pump, shown in accordance with an embodiment.

Referring now to FIG. 2A, a perspective view of pump 260 is shown in accordance with an embodiment. In one embodiment, FIG. 2A includes pump 260, nipple 255 and hose 250.

Figure 2B:
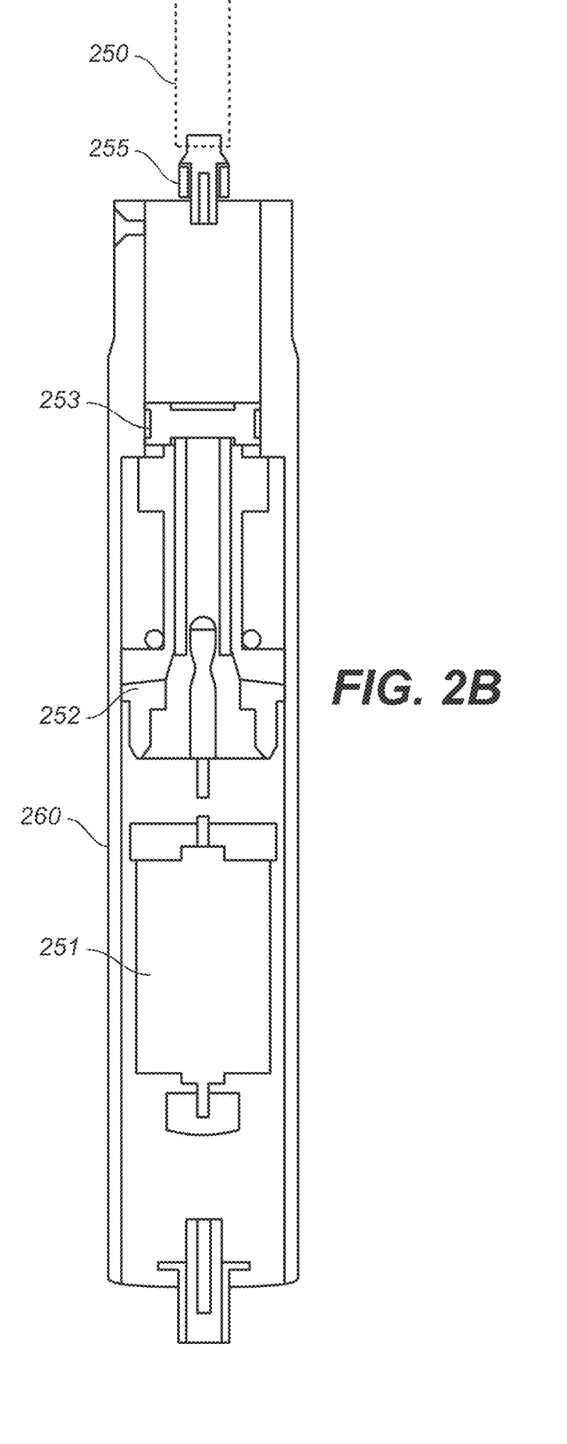
FIG. 2B is a side cutaway view of the hydraulic pump, shown in accordance with an embodiment.

Referring now to FIG. 2B, a side cutaway view of pump 260 is shown in accordance with an embodiment. In one embodiment, the pump 260 is a hydraulic pump and includes a motor 251, a gearbox and leadscrew 252, and a master piston 253. In one embodiment, the motor 251 drives the leadscrew 252 and hex system which drives the master piston 253 outward to push fluid into hose 250. In other words, pump 260 provides fluid to hydraulically-adjustable preload and/or crossover system 200 via hose 250. Although a hydraulic pump is shown, in one embodiment, the hydraulically-adjustable preload and/or crossover system 200 could use another pump 260 such as a motor turning a lead screw to drive a master piston, using the motor or the hydraulic pump in combination with an accumulator for faster actuation than the motor or the hydraulic pump alone, and the like.

Figure 3A:
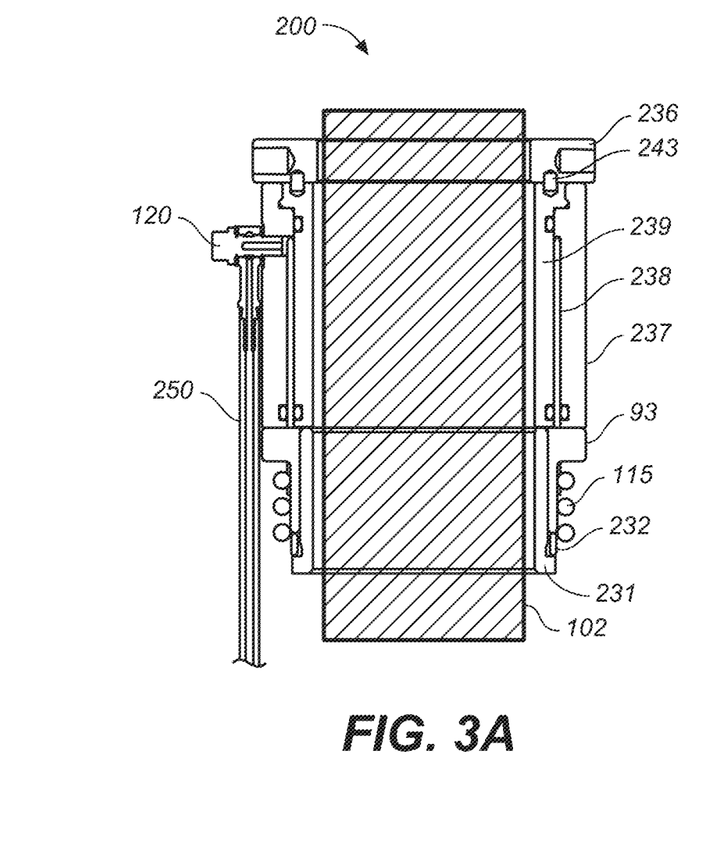
FIG. 3A is a cut-away view of a hydraulically-adjustable preload and/or crossover system, shown in accordance with an embodiment.
Figure 3B:
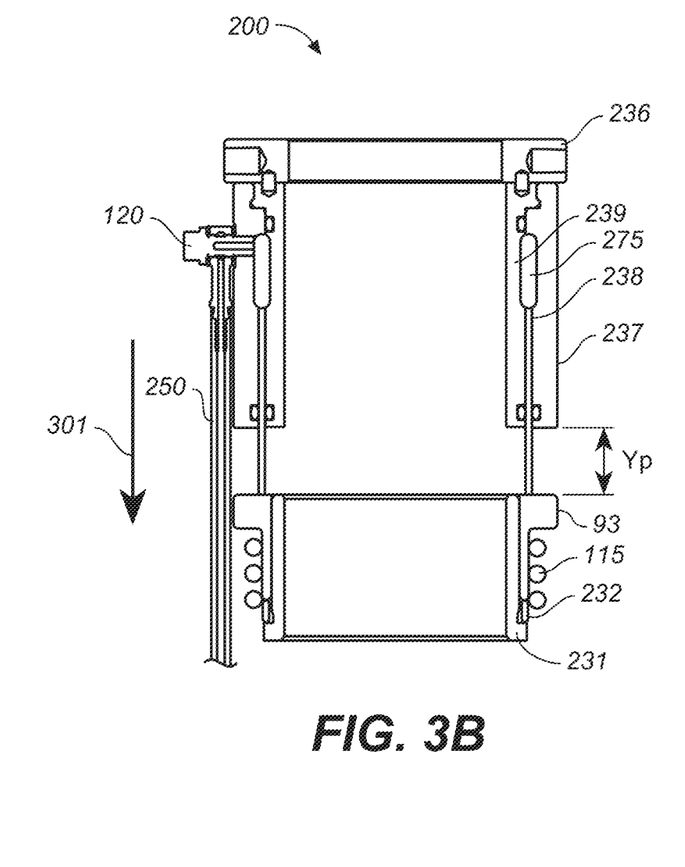
FIG. 3B is a cut-away view of the hydraulically-adjustable preload and/or crossover system of FIG. 3A, wherein the preload flange is extended further than it is in FIG. 3A, in accordance with an embodiment.

Referring now to FIG. 3A, a cut-away view of a hydraulically-adjustable preload and/or crossover system 200 is shown in accordance with an embodiment. FIG. 3B is a cut-away view of the hydraulically-adjustable preload and/or crossover system 200 of FIG. 3A, wherein the preload flange 93 is extended further than it is in FIG. 3A, in accordance with an embodiment.

Referring now to FIGS. 3A and 3B, the hydraulically-adjustable preload and/or crossover system 200 includes a cinch/clocking ring 236, housing 233 which includes an inner housing wall 239 and an outer housing wall 237, a slave cylinder 238, preload flange 93, coil spring 115, lock ring 232, and adjustable crossover 231. hydraulically-adjustable preload and/or crossover system 200 also includes fluid port 120, hose 250, and pump 260.

In one embodiment, the hydraulically-adjustable preload and/or crossover system 200 is self-contained. That is, hydraulically-adjustable preload and/or crossover system 200 is able to be placed about the outside of an existing main damper cylinder 102 (shown in FIG. 3A for clarity). In one embodiment, a feature (such as threading, etc.) on main damper cylinder 102 will be used by cinch/clocking ring 236 to hold hydraulically-adjustable preload and/or crossover system 200 in an adjustably fixed location on main damper cylinder 102. In so doing, once hydraulically-adjustable preload and/or crossover system 200 is mounted on main damper cylinder 102 in its desired location, the cinch/clocking ring 236 will fix that location such that hydraulically-adjustable preload and/or crossover system 200 will not move axially on main damper cylinder 102. In one embodiment, once cinch/clocking ring 236 is coupled with main damper cylinder 102, two pins 243 are used to clock the hydraulically-adjustable preload and/or crossover system 200 to the cinch/clocking ring 236.

In one embodiment, while the location of hydraulically-adjustable preload and/or crossover system 200 (including the inner housing wall 239 and the outer housing wall 237 which make up the housing 233) will be in a fixed location with respect to main damper cylinder 102, the slave cylinder 238, preload flange 93, lock ring 232, and adjustable crossover 231 will be able to move axially along main damper cylinder 102. That is, the inner and outer housing wall guides will fluidly seal the slave cylinder chamber. As fluid is introduced into the slave cylinder chamber, the slave cylinder will be driven in the direction indicated by arrow 301 thereby displacing preload flange 93. In one embodiment, preload flange 93 is coupled to the adjustable crossover 231 through a threaded joint with a lock ring 232.

For example, as shown in FIG. 3B, as fluid pressure is applied through fluid port 120, slave cylinder 238 is disposed between inner housing wall 239 and outer housing wall 237 of housing 233 such that a slave cylinder chamber 275 is formed. Therefore, as fluid is pumped into hose 250 and through fluid port 120, the fluid will flow into the top of slave cylinder chamber 275 and ultimately force slave cylinder 238 to move with respect to housing 233 in a direction indicated by arrow 301 along the axis of main damper cylinder 102. In the embodiment of FIG. 3B, introduction of sufficient fluid will cause slave cylinder 238 to move in the direction indicated by arrow 301. As the slave cylinder 238 moves slave cylinder chamber 275 will be at least partially filled with fluid. Thus, by controlling the fluid pressure in slave cylinder chamber 275, the position of the slave cylinder 238 with respect to the inner and outer housing wall of hydraulically-adjustable preload and/or crossover system 200, is also controlled.

In one embodiment, the fluid in slave cylinder chamber 275 will drive the slave cylinder 238 toward preload flange 93 which will cause preload flange 93 to move downward (e.g., the direction indicated by arrow 301) a distance Yp (e.g., in one embodiment the same distance the slave cylinder 238 was displaced by the fluid in slave cylinder chamber 275. In one embodiment, (such as shown in the comparison of FIG. 3A to FIG. 3B) the change in the location of preload flange 93 (e.g., toward lower flange 111 of FIG. 1A) will change the preload on the coil spring 115.

That is, because one end of coil spring 115 abuts (or is coupled to) preload flange 93, movement of slave cylinder 238 (and, therefore, preload flange 93) in the direction of arrow 301, will cause preload flange 93 to compress coil spring 115. It should be noted that in FIG. 3B, preload flange 93 has compressed coil spring 115 more than preload flange 93 has compressed coil spring 115 in FIG. 3A. Therefore, in FIG. 3B, preload flange 93 is disposed such that it induces a greater preload on coil spring 115 than the preload induced on coil spring 115 by preload flange 93 when preload flange 93 is disposed as shown in FIG. 3A.

In one embodiment, (such as shown in FIG. 1B) the change in the location of preload flange 93 will change the preload on the dual spring system. In one embodiment, the change in location of preload flange 93 will result in a ride height adjustment. In one embodiment, the movement of preload flange 93 the distance Yp will also move the location of crossover 231 closer to the lower flange 111 and stop ring 73.

In one embodiment, the adjustment to the preload is automated by the hydraulic system discussed in further detail herein.

Figure 4A:
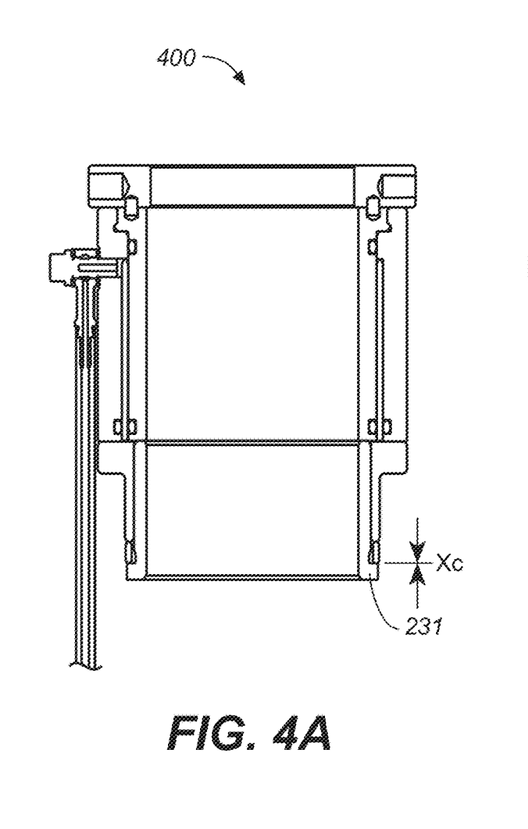
FIG. 4A is a cut-away view of a hydraulically-adjustable preload and/or crossover system, shown with a minimum crossover adjustment in accordance with an embodiment.

Referring now to FIG. 4A, a cut-away view 400 of a hydraulically-adjustable preload and/or crossover system 200 is shown with a minimum crossover adjustment Xc in accordance with an embodiment.

Figure 4B:
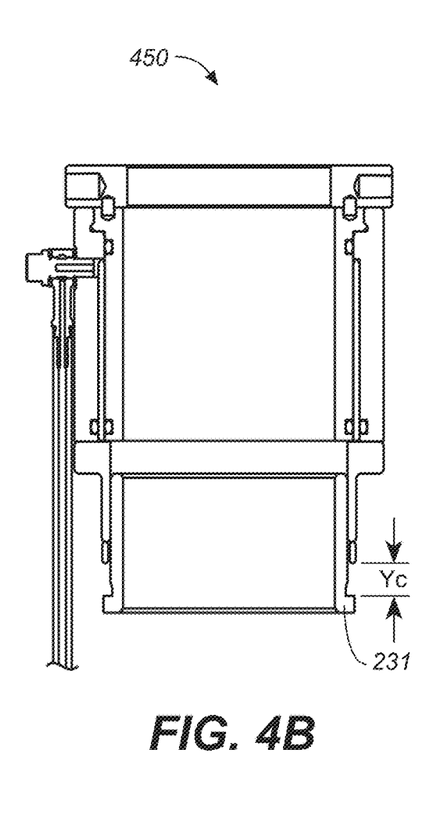
FIG. 4B is a cut-away view of the hydraulically-adjustable preload and/or crossover system, wherein the crossover is extended to an intermediate amount, shown in accordance with an embodiment.

FIG. 4B is a cut-away view 450 of the hydraulically-adjustable preload and/or crossover system 200, wherein the crossover 231 is extended further (e.g., to an intermediate crossover adjustment Yc) than it is in FIG. 4A in accordance with an embodiment.

Figure 4C:
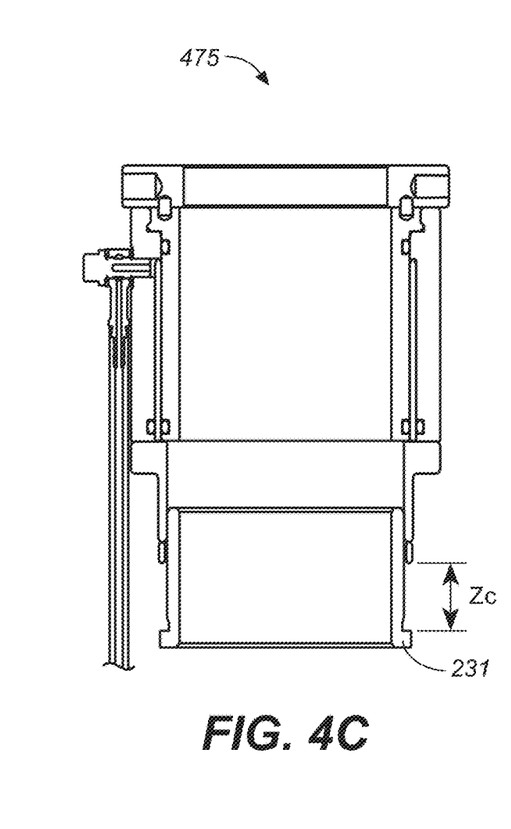
FIG. 4C is a cut-away view of the hydraulically-adjustable preload and/or crossover, wherein the crossover is extended a maximum amount, shown in accordance with an embodiment.

FIG. 4C is a cut-away view 475 of the hydraulically-adjustable preload and/or crossover system 200, wherein the crossover 231 is extended a maximum amount (e.g., crossover adjustment Zc) in accordance with an embodiment. In one embodiment, the adjustable crossover 231 is threaded to the preload flange 93 and can be manually adjusted (e.g., within a range such as, but not limited to 0-2.5 inches) and/or replaceable with a longer or shorter length adjustable crossover 231 is a larger or smaller crossover distance is desired, needed, and/or required. In one embodiment, adjustable crossover 231 is locked into place with lock ring 232.

As shown in FIGS. 4A-4C, the change is in the crossover distance with respect to the preload flange 93. Both are displaced the same amount by the hydraulic preload system. In one embodiment, if additional crossover distance is required, the adjustable crossover 231 component can be replaced with a longer adjustable crossover 231 component. In one embodiment, the adjustment range is 1.5 to 2.5 inches. However, as stated herein, that range is modifiable (e.g., may be longer or shorter) based on the length of the crossover 231 component, the operating range of the damper, and the environment in which it is being used (e.g., racetrack versus desert offroad, etc.).

Figure 5A:
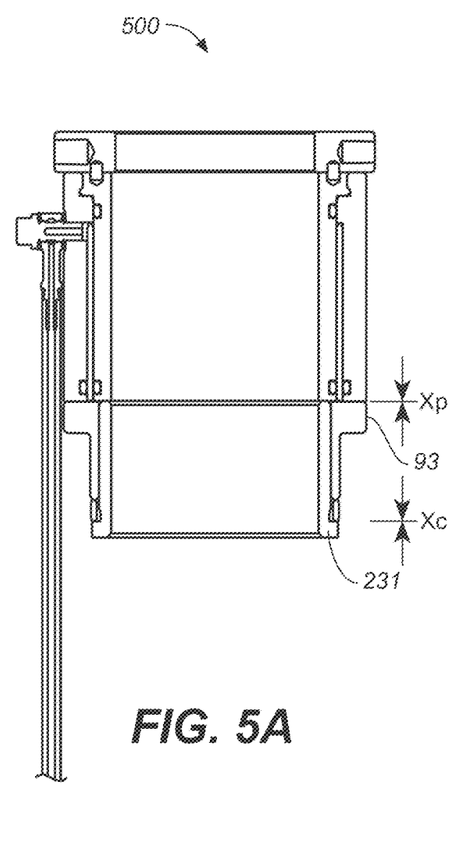
FIG. 5A, a cut-away view of a hydraulically-adjustable preload and/or crossover system is shown with a minimum crossover adjustment and a minimum preload adjustment, shown in accordance with an embodiment.

Referring now to FIG. 5A, a cut-away view 500 of a hydraulically-adjustable preload and/or crossover system 200 is shown with a minimum crossover adjustment Xc and a minimum preload adjustment Xp in accordance with an embodiment.

Figure 5B:
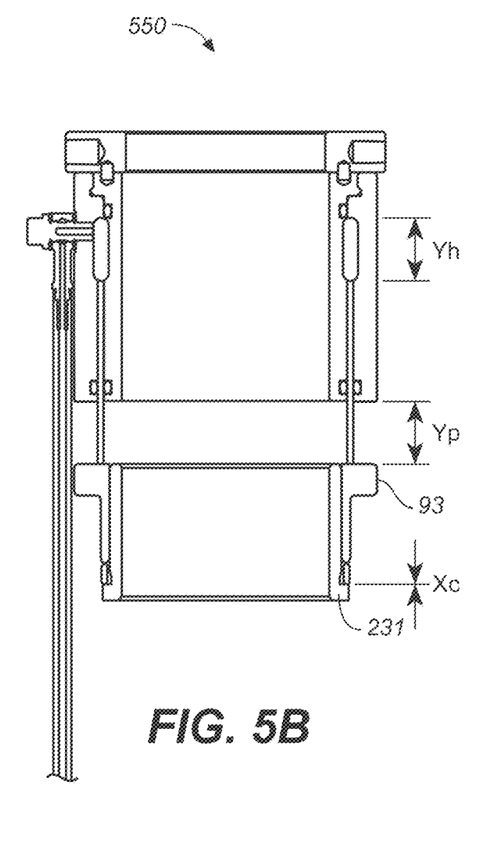
FIG. 5B is a cut-away view of the hydraulically-adjustable preload and/or crossover system, wherein the crossover adjustment is minimized, but the preload flange is extended to an intermediate position, shown in accordance with an embodiment.

FIG. 5B is a cut-away view 550 of the hydraulically-adjustable preload and/or crossover system 200, wherein the crossover adjustment is minimized Xc, but the preload flange 93 is extended as compared to FIG. 5A (e.g., to an intermediate position Yp) in accordance with an embodiment. As noted, although there has been no crossover adjustment, the adjustable crossover 231 has been moved toward lower flange 111 by the distance Yp.

Figure 5C:
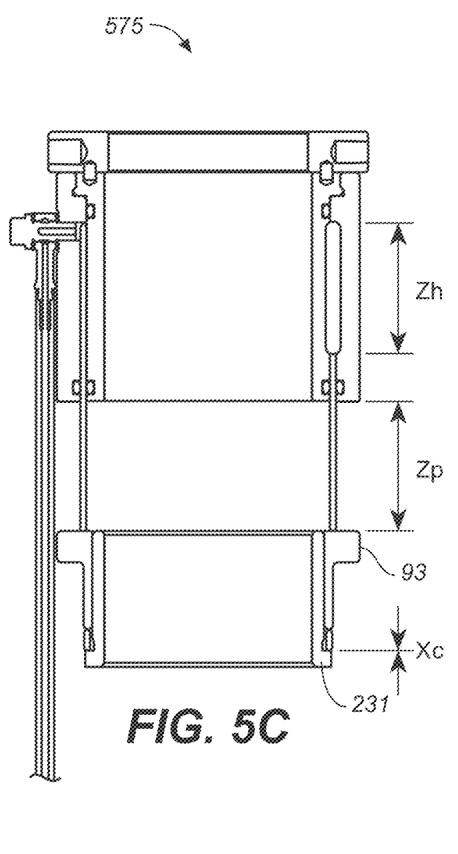
FIG. 5C is a cut-away view of the hydraulically-adjustable preload and/or crossover system, wherein the crossover adjustment is minimized, but the preload flange is extended a maximum amount, shown in accordance with an embodiment.

FIG. 5C is a cut-away view 575 of the hydraulically-adjustable preload and/or crossover system 200, wherein the crossover adjustment is minimized Xc, but the preload flange 93 is extended a maximum amount (e.g., to a maximum displacement Zp) in accordance with an embodiment. Again, although there has been no crossover adjustment, the adjustable crossover 231 has been moved toward lower flange 111 by the distance Zp.

As shown in FIGS. 5A-5C, the hydraulically-adjustable preload and/or crossover system 200 can move both the preload flange 93 and the crossover 231 position. In one embodiment, the adjustable crossover 231 is displaced the same amount as the preload flange 93. In one embodiment, if additional preload is required, the preload flange 93 can be replaced with a longer preload flange 93 component. In one embodiment, the adjustment range is 0 to 2 inches. However, as stated herein, that range is modifiable (e.g., may be longer or shorter) based on the length of the preload flange 93 component, the operating range of the damper, and the environment in which it is being used (e.g., racetrack versus desert offroad, etc.).

Figure 6A:
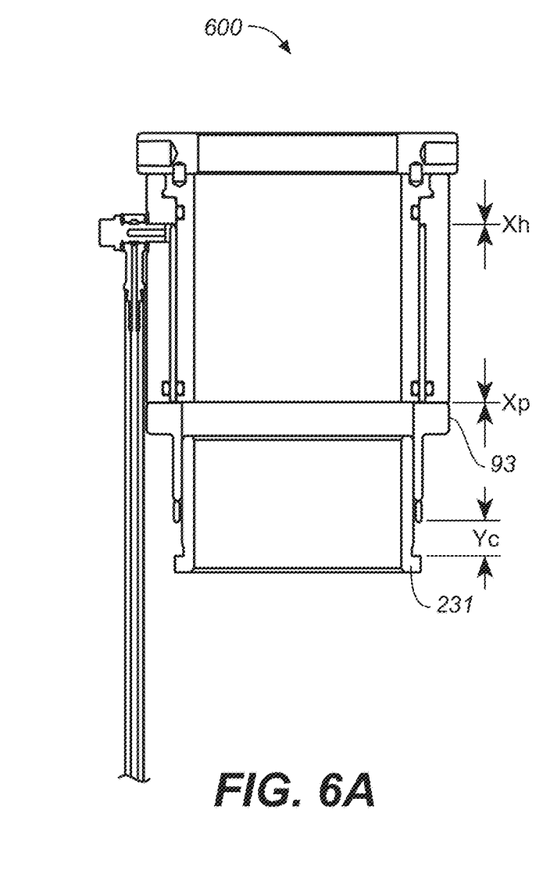
FIG. 6A, a cut-away view of a hydraulically-adjustable preload and/or crossover system is shown with an intermediate crossover adjustment and a minimum preload adjustment, shown in accordance with an embodiment.

Referring now to FIG. 6A, a cut-away view 600 of a hydraulically-adjustable preload and/or crossover system 200 is shown with an intermediate crossover adjustment Yc and a minimum preload adjustment Xp in accordance with an embodiment.

Figure 6B:
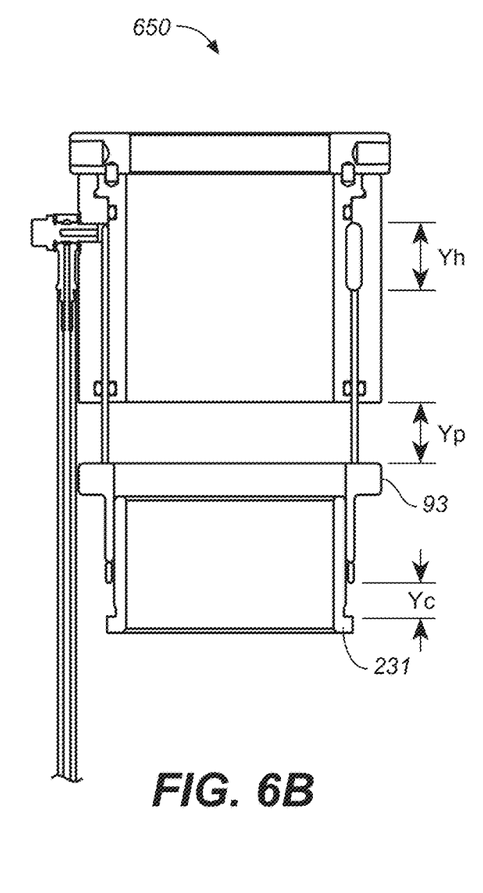
FIG. 6B is a cut-away view of the hydraulically-adjustable preload and/or crossover system, with an intermediate crossover adjustment and the preload flange is extended to an intermediate position, shown in accordance with an embodiment.

FIG. 6B is a cut-away view 650 of the hydraulically-adjustable preload and/or crossover system 200, with an intermediate crossover adjustment Yc and the preload flange 93 is extended as compared to FIG. 6A (e.g., to an intermediate position Yp) in accordance with an embodiment. In one embodiment, although there has been an intermediate crossover adjustment Yc, the adjustable crossover 231 has been further moved toward lower flange 111 by the preload flange 93 adjustment (e.g., distance Yp).

Figure 6C:
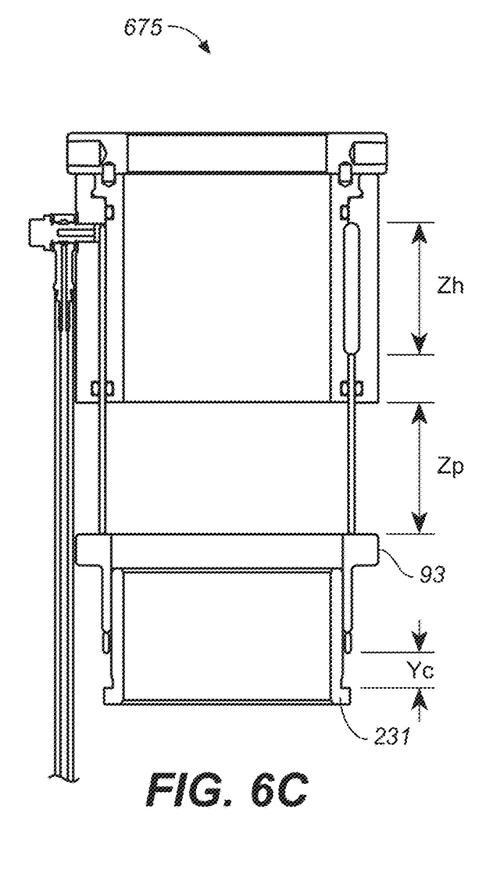
FIG. 6C is a cut-away view of the hydraulically-adjustable preload and/or crossover system, with an intermediate crossover adjustment and the preload flange is extended a maximum amount, shown in accordance with an embodiment.

FIG. 6C is a cut-away view 675 of the hydraulically-adjustable preload and/or crossover system 200, with an intermediate crossover adjustment Yc and the preload flange 93 is extended a maximum amount (e.g., to a maximum displacement Zp) in accordance with an embodiment. Similar to FIG. 6B, although there has been an intermediate crossover adjustment Yc, the adjustable crossover 231 has been further moved toward lower flange 111 by the preload flange 93 adjustment (e.g., distance Zp).

As shown in FIGS. 6A-6C, the hydraulically-adjustable preload and/or crossover system 200 can move both the preload flange 93 and the crossover 231 position. In one embodiment, the adjustable crossover 231 is displaced the same amount as the preload flange 93. In one embodiment, if additional preload is required, the preload flange 93 can be replaced with a longer preload flange 93 component. In one embodiment, the adjustment range is 0 to 2 inches. However, as stated herein, that range is modifiable (e.g., may be longer or shorter) based on the length of the preload flange 93 component, the operating range of the damper, and the environment in which it is being used (e.g., racetrack versus desert offroad, etc.).

In one embodiment, if additional crossover distance is required, the adjustable crossover 231 component can be replaced with a longer crossover 231 component. In one embodiment, the adjustment range is 1.5 to 2.5 inches. However, as stated herein, that range is modifiable (e.g., may be longer or shorter) based on the length of the crossover 231 component, the operating range of the damper, and the environment in which it is being used (e.g., racetrack versus desert offroad, etc.).

Figure 7A:
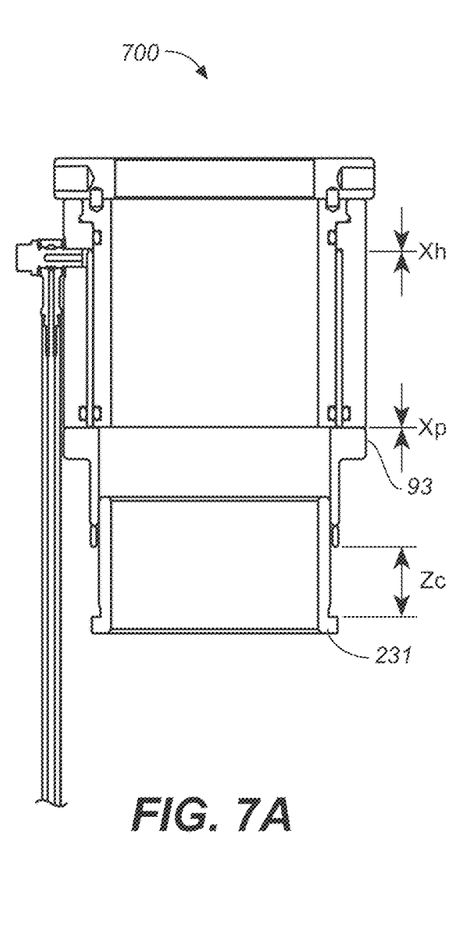
FIG. 7A is a cut-away view of a hydraulically-adjustable preload and/or crossover system is shown with a maximum crossover adjustment and a minimum preload adjustment, shown in accordance with an embodiment.

Referring now to FIG. 7A, a cut-away view 700 of a hydraulically-adjustable preload and/or crossover system 200 is shown with a maximum crossover adjustment Zc and a minimum preload adjustment Xp in accordance with an embodiment.

Figure 7B:
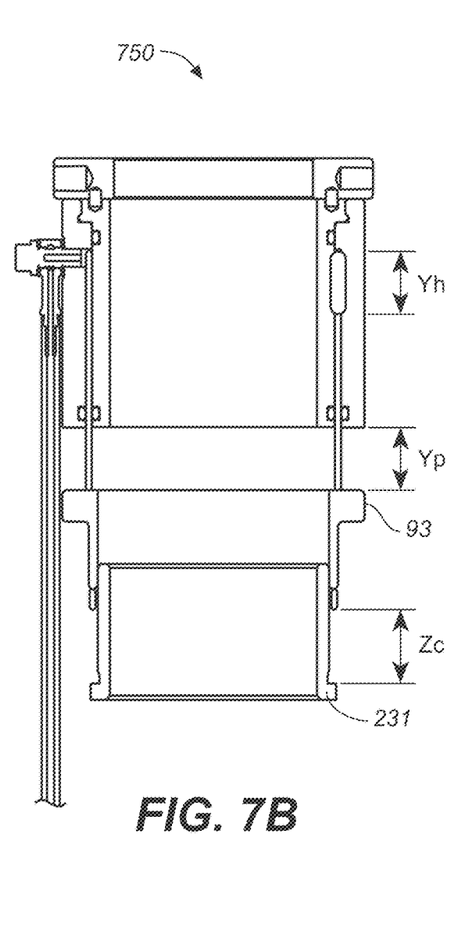
FIG. 7B is a cut-away view of the hydraulically-adjustable preload and/or crossover system, with a maximum crossover adjustment and the preload flange is extended to an intermediate position, shown in accordance with an embodiment.

FIG. 7B is a cut-away view 750 of the hydraulically-adjustable preload and/or crossover system 200, with a maximum crossover adjustment Zc and the preload flange 93 is extended as compared to FIG. 7A (e.g., to an intermediate position Yp) in accordance with an embodiment. In one embodiment, although there has been a maximum crossover adjustment Zc, the adjustable crossover 231 has been further moved toward lower flange 111 by the preload flange 93 adjustment (e.g., distance Yp).

Figure 7C:
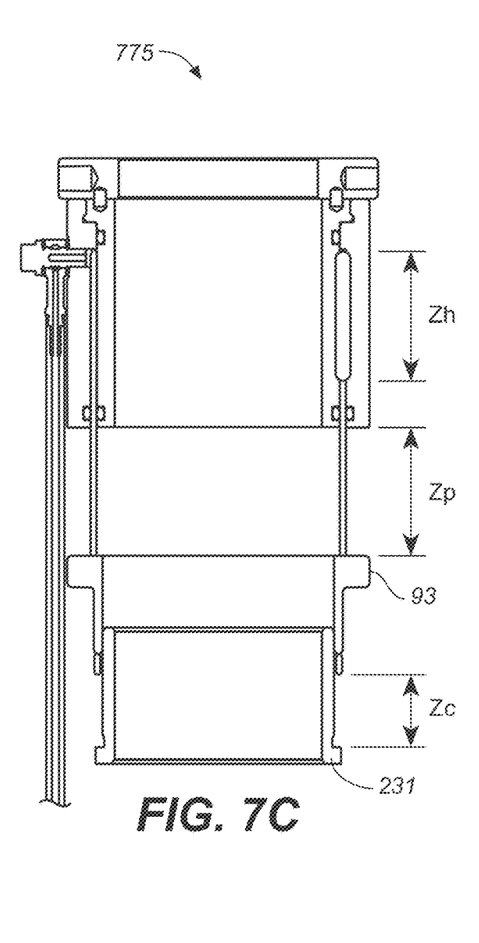
FIG. 7C is a cut-away view of the hydraulically-adjustable preload and/or crossover system, with a maximum crossover adjustment and the preload flange is extended a maximum amount, shown in accordance with an embodiment.

FIG. 7C is a cut-away view 775 of the hydraulically-adjustable preload and/or crossover system 200, with a maximum crossover adjustment Zc and the preload flange 93 is extended a maximum amount (e.g., to a maximum displacement Zp) in accordance with an embodiment. Similar to FIG. 7B, although there has been a maximum crossover adjustment Zc, the adjustable crossover 231 has been further moved toward lower flange 111 by the preload flange 93 adjustment (e.g., distance Zp).

As shown in FIGS. 7A-7C, the hydraulically-adjustable preload and/or crossover system 200 can move both the preload flange 93 and the crossover 231 position. In one embodiment, the adjustable crossover 231 is displaced the same amount as the preload flange 93. In one embodiment, if additional preload is required, the preload flange 93 can be replaced with a longer preload flange 93 component. In one embodiment, the adjustment range is 0 to 2 inches. However, as stated herein, that range is modifiable (e.g., may be longer or shorter) based on the length of the preload flange 93 component, the operating range of the damper, and the environment in which it is being used (e.g., racetrack versus desert offroad, etc.).

In one embodiment, if additional crossover distance is required, the adjustable crossover 231 component can be replaced with a longer crossover 231 component. In one embodiment, the adjustment range is 1.5 to 2.5 inches. However, as stated herein, that range is modifiable (e.g., may be longer or shorter) based on the length of the crossover 231 component, the operating range of the damper, and the environment in which it is being used (e.g., racetrack versus desert offroad, etc.). Thus, in various embodiments of the present invention, one or both of the preload and the cross-over point for the damper are hydraulically-adjustable as described above.

Figure 8:
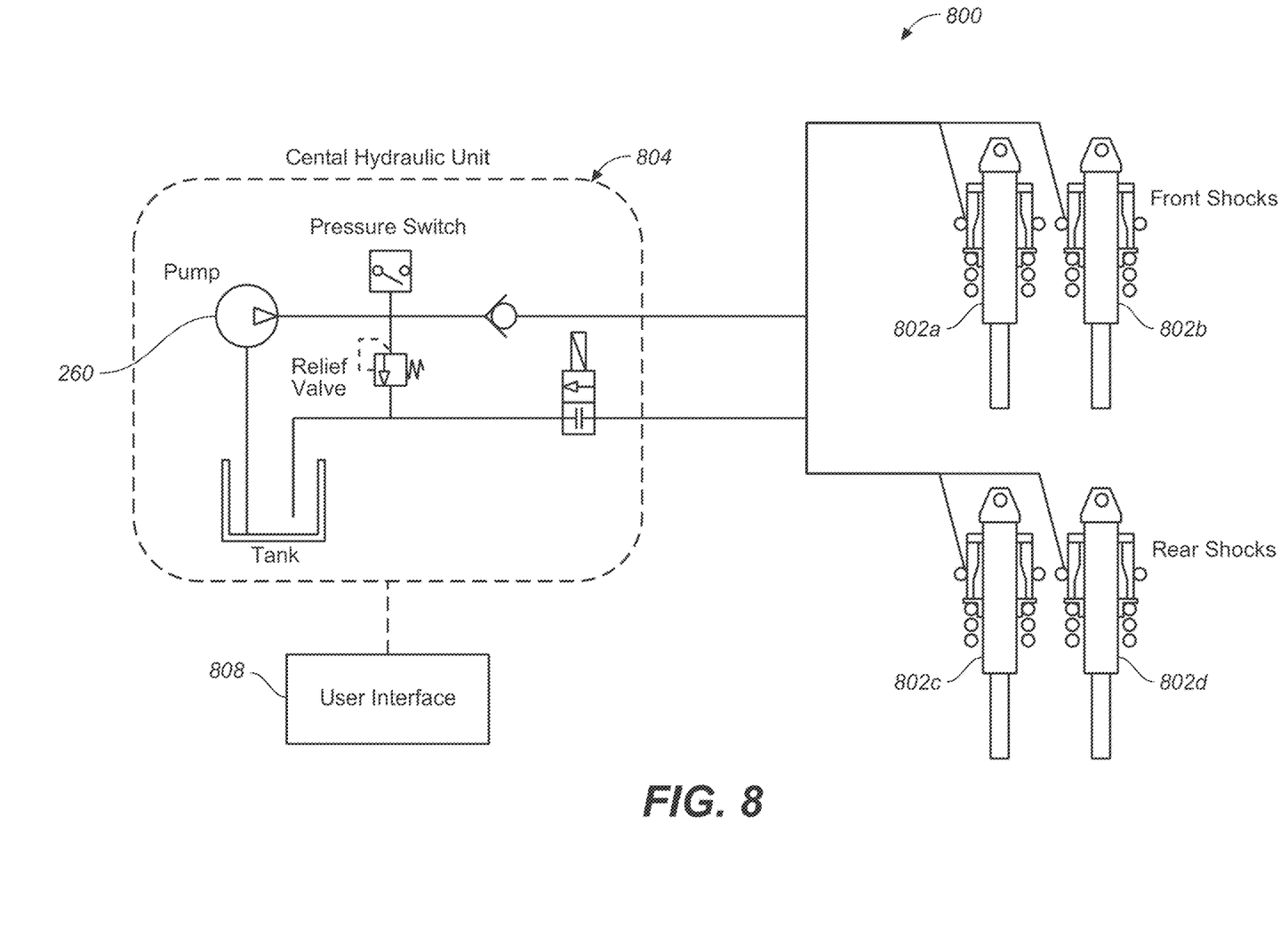
FIG. 8 is a schematic of an electronic control system, shown in accordance with an embodiment.

Referring now to FIG. 8, a schematic view of a control system 800 is shown in accordance with an embodiment. In one embodiment, control system 800 includes a plurality of dampers 802a-802d (each of a type such as, for example, damper 100 of FIG. 1A or 1B) with hydraulically-adjustable preload and/or crossover, a central hydraulic unit 804, and a user interface 808.

In one embodiment, there is at least one damper, of the plurality of dampers 802a-802d, located at each of a vehicle wheel suspension location. For example, damper 802a at the left front, damper 802b at the right front, damper 802c at the left rear, and damper 802d at the right rear.

In one embodiment, the plurality of dampers 802a-802d are selected from damper types such as, but not limited to, an in-line damper, a piggyback damper, a compression adjust only damper, a rebound adjust only damper, an independent compression and rebound adjust damper, a dependent compression and rebound adjust single-valve damper, and the like. Additionally, in the various embodiments of the present invention, control system 800 may include, or operate in conjunction with, manual dampers, active dampers, passive dampers, or any combination of such types of dampers.

Although control system 800 is shown as interacting with four dampers such as would be likely found in a four wheeled vehicle suspension configuration, it should be appreciated that the technology is well suited for application in other vehicles with different suspension configurations. The different configurations can include a two wheel suspension configuration like that of a motorcycle, ebike, bicycle, moped, and the like; a one, two or three "wheel" suspension configuration like that of a snowmobile, trike, or boat, a plurality of dampers at each of the damper suspension locations such as is often found in off-road vehicles, UTVs, powersports vehicles, heavy trucking vehicle, recreational vehicles (RVs), agriculture vehicles, maritime vehicles, and the like. The use of a single damper in a four suspension location configuration, as shown herein, is provided merely as one implementation example of the various embodiments of the present invention.

In one embodiment, each of dampers 802a-802d are coupled to a central hydraulic unit 804. In one embodiment, central hydraulic unit 804 controls the hydraulic pressure applied to any one or more of dampers 802a-802d thereby providing a centralized control for the amount of preload at each of dampers 802a-802d. Thus, in the present embodiment, unlike many conventional approaches, the operating characteristics of the damper (e.g. preload on any one or more of dampers 802a-802d) can be controlled by central hydraulic unit 804 (e.g., using a pump 260) thereby eliminating the need for manual adjustments of dampers 802a-802d directly at the location of the coil spring or the plurality of coil springs.

Referring still to FIG. 8, in another embodiment, a user interface 808 is located, for example, in the cockpit of the vehicle to which dampers 802a-802d are coupled. In various embodiments of the present invention, the user can concurrently make adjustments to the preload of multiple dampers (e.g., more than one of dampers 802a-802d) of a multi-wheeled vehicle.

For example, in one embodiment, user interface 808 is communicatively coupled with central hydraulic unit 804. As such, a user is able to select a desired mode (e.g., comfort, sport, or race) at user interface 808. Once the user selects the desired mode, central hydraulic unit 804 places the appropriate preload on each of dampers 802a-802d to match the user's selected mode. In such an embodiment, the preload for each of dampers 802a-802d is remotely adjustable (e.g., the user controls or adjusts the preload from the vehicle's cockpit). Further, in various embodiments, in addition to being remotely adjustable, the operating characteristics of dampers 802a-802d are controlled without requiring the user to adjust each of dampers 802a-802d individually and separately. That is, once a desired suspension mode is selected by the user, embodiments of the present invention adjust each of dampers 802a-802d as needed to meet the user's desired mode. Hence, in various embodiments of the present invention, a mode selection made by a user, from a location remote from multiple dampers 802a-802d, ultimately results in hydraulic adjustment of multiple dampers 802a-802d to achieve an appropriate damper preload for each of the multiple dampers 802a-802d.

In one embodiment, a central hydraulic unit 804 can control the hydraulic pressure applied to each of the multiple dampers 802a-802d. By controlling the hydraulic pressure applied to each damper, the central hydraulic unit 804 is able to hydraulically adjust the preload for each damper from a remote location. Therefore, since the operating characteristics of the damper (e.g., the preload and/or crossover for damper 100) can be controlled by central hydraulic unit 804 the need for manual adjustments of the damper being performed by a user and directly at the location of the springs is removed. However, in various embodiments, if a significantly different adjustment (new set-up, modified suspension, etc.) is required to make a significant cross-over adjustment that is outside the existing cross-over adjustment range, as described herein, the user (or mechanic, technician, etc.) can concurrently make adjustments and/or changes to one or more of the cross-over point of multiple dampers of a multi-wheeled vehicle.

In one embodiment, the user interface 808, central hydraulic unit 804, pump 260, and one or more of the other components of control system 800 may receive power from the vehicle, from a stand-alone battery (or other power source), or the like. In one embodiment, a bus can be used to enable signals to be transmitted (wired or wirelessly) between user interface 808, central hydraulic unit 804, one or more of the multiple dampers 802a-802d, and the like.

In one embodiment, user interface 808, central hydraulic unit 804, one or more of the multiple dampers 802a-802d, and one or more of the other components of control system 800 may include a processor, memory, and/or other computer components. An example and the description of a control system such as control system 800 is described in U.S. Pat. No. 10,933,710, to include FIG. 1, the whole of which is incorporated by reference herein, in its entirety.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A hydraulically-adjustable preload system comprising:
   a housing configured to couple with a main damper cylinder, said housing comprising:
   a slave cylinder chamber;
   a slave cylinder within a portion of said slave cylinder chamber, said slave cylinder telescopically movable with respect to said housing in a direction along an axis of said main damper cylinder;
   a fluid chamber within a portion of said slave cylinder chamber; and
   a fluid port configured to provide a fluid flow for said fluid chamber, wherein an increase in a fluid volume within said fluid chamber causes a portion of said slave cylinder to telescopically extend from said slave cylinder chamber in an axial direction along said main damper cylinder;
   a preload flange coupled with said slave cylinder at an end of said housing, said preload flange disposed such that a change in a location of said slave cylinder causes a change in a location of said preload flange and a corresponding change in a preload applied to a coil spring coupled with said housing, said coil spring disposed surrounding an external surface of said main damper cylinder, said coil spring having a first end coupled with said preload flange and a second end coupled with a lower flange, said coil spring applying a pressure to said preload flange and said lower flange to maintain a length which a damping rod initially extends from said main damper cylinder, said preload flange providing an initial preload to said hydraulically-adjustable preload system, said initial preload occurring prior to any additional telescopic movement of said slave cylinder in said axial direction along said main damper cylinder occurring during operation of said main damper cylinder; and an adjustable crossover coupled with said preload flange, said adjustable crossover disposed such that said change in said location of said preload flange causes a change in a location of said adjustable crossover.

2. The hydraulically-adjustable preload system of claim 1, further comprising:
said fluid port configured to provide a fluid flow for said fluid chamber, wherein a decrease in said fluid volume within said fluid chamber allows said portion of said slave cylinder to telescopically retract into said slave cylinder chamber.

3. The hydraulically-adjustable preload system of claim 1, further comprising:
a hose coupled with said fluid port; and
a pump coupled with said hose, said pump configured to pump a fluid via said hose into said fluid port to increase said fluid volume in said slave cylinder chamber and receive said fluid via said hose from said fluid port to reduce said fluid volume in said slave cylinder chamber.

4. The hydraulically-adjustable preload system of claim 3, wherein said pump is selected from a group consisting of: a motor turning a lead screw to drive a master piston, a hydraulic pump.

5. The hydraulically-adjustable preload system of claim 3, further comprising:
an accumulator operationally coupled with said pump, said accumulator to provide an increase in actuation that is greater than an actuation of said pump alone.

6. The hydraulically-adjustable preload system of claim 1, wherein said hydraulically-adjustable preload system is a modular hydraulically-adjustable preload system configured to be retrofit to said main damper cylinder of a legacy shock assembly.

7. A hydraulically-adjustable crossover system comprising:
a housing configured to couple with a main damper cylinder in an adjustably fixed location, said housing comprising:
a slave cylinder chamber;
a slave cylinder within a portion of said slave cylinder chamber, said slave cylinder telescopically movable with respect to said housing in a direction along an axis of said main damper cylinder;
a fluid chamber within a portion of said slave cylinder chamber; and
a fluid port configured to provide a fluid flow for said fluid chamber, wherein an increase in a fluid volume within said fluid chamber causes a portion of said slave cylinder to telescopically extend from said slave cylinder chamber in an axial direction along said main damper cylinder; and
an adjustable crossover coupled with said slave cylinder at an end of said housing, said adjustable crossover disposed such that a change in a location of said slave cylinder causes a change in a location of said adjustable crossover, said adjustable crossover including a clocking ring for defining an initial position of said adjustable crossover with respect to said housing, said adjustable crossover configured to extend or retract with respect to said housing in a direction along a central axis of said main damper cylinder parallel with a damping rod.

8. The hydraulically-adjustable crossover system of claim 7, further comprising:
a preload flange coupled with said slave cylinder at said end of said housing, said preload flange disposed such that a change in said location of said slave cylinder causes a change in a location of said preload flange, said preload flange providing an initial preload to said hydraulically-adjustable crossover system, said initial preload occurring prior to any additional telescopic movement of said slave cylinder in said axial direction along said main damper cylinder occurring during operation of said main damper cylinder.

9. The hydraulically-adjustable crossover system of claim 7, further comprising:
said fluid port configured to provide a fluid flow for said fluid chamber, wherein a decrease in said fluid volume within said fluid chamber allows said portion of said slave cylinder to telescopically retract into said slave cylinder chamber.

10. The hydraulically-adjustable crossover system of claim 7, further comprising:
a hose coupled with said fluid port; and
a pump coupled with said hose, said pump configured to pump a fluid via said hose into said fluid port to increase said fluid volume in said slave cylinder chamber and receive said fluid via said hose from said fluid port to reduce said fluid volume in said slave cylinder chamber.

11. The hydraulically-adjustable crossover system of claim 10, wherein said pump is selected from a group consisting of: a motor turning a lead screw to drive a master piston, a hydraulic pump.

12. The hydraulically-adjustable crossover system of claim 10, further comprising:
an accumulator operationally coupled with said pump, said accumulator to provide an increase in actuation that is greater than an actuation of said pump alone.

13. The hydraulically-adjustable crossover system of claim 7, wherein said hydraulically-adjustable crossover system is a modular hydraulically-adjustable crossover system configured to be retrofit to said main damper cylinder of a legacy shock assembly.

14. A modular hydraulically-adjustable preload and crossover system comprising:
a clocking ring configured to couple with a main damper cylinder in an adjustably fixed location;
a housing coupled with said clocking ring, said housing comprising:
a slave cylinder chamber;
a slave cylinder within a portion of said slave cylinder chamber, said slave cylinder telescopically movable with respect to said housing in a direction along an axis of said main damper cylinder;
a fluid chamber within a portion of said slave cylinder chamber; and
a fluid port configured to provide a fluid flow for said fluid chamber, wherein an increase in a fluid volume within said fluid chamber causes a portion of said slave cylinder to telescopically extend from said slave cylinder chamber in an axial direction along said main damper cylinder;
a preload flange coupled with said slave cylinder at an end of said housing opposite of said clocking ring, said preload flange disposed such that a change in a location of said slave cylinder causes a change in a location of said preload flange and a corresponding change in a preload applied to a coil spring coupled with said housing, said coil spring disposed surrounding an external surface of said main damper cylinder, said coil spring having a first end coupled with said preload flange and a second end coupled with a lower flange, said coil spring applying a pressure to said preload flange and said lower flange to maintain a length which a damping rod initially extends from said main damper cylinder, said preload flange providing an initial preload to said modular hydraulically-adjustable preload and crossover system, said initial preload occurring prior to any additional telescopic movement of said slave cylinder in said axial direction along said main damper cylinder occurring during operation of said main damper cylinder; and an adjustable crossover coupled with said preload flange, said adjustable crossover disposed such that said change in said location of said preload flange causes a change in a location of said adjustable crossover, said adjustable crossover including said clocking ring for defining an initial position of said adjustable crossover with respect to said housing, said adjustable crossover configured to extend or retract with respect to said housing in a direction along a central axis of said main damper cylinder parallel with a damping rod.

15. The modular hydraulically-adjustable preload and crossover system of claim 14, wherein said adjustable crossover is coupled with said preload flange via a threaded connection such that said location of said adjustable crossover is manually adjustable with respect to said preload flange.

16. The modular hydraulically-adjustable preload and crossover system of claim 14, further comprising:
said fluid port configured to provide a fluid flow for said fluid chamber, wherein a decrease in said fluid volume within said fluid chamber allows said portion of said slave cylinder to telescopically retract into said slave cylinder chamber.

17. The modular hydraulically-adjustable preload and crossover system of claim 14, further comprising:
a hose coupled with said fluid port; and
a pump coupled with said hose, said pump configured to pump a fluid via said hose into said fluid port to increase said fluid volume in said slave cylinder chamber and receive said fluid via said hose from said fluid port to reduce said fluid volume in said slave cylinder chamber.

18. The modular hydraulically-adjustable preload and crossover system of claim 17, wherein said pump is selected from a group consisting of: a motor turning a lead screw to drive a master piston, a hydraulic pump.

19. The modular hydraulically-adjustable preload and crossover system of claim 17, further comprising:
an accumulator operationally coupled with said pump, said accumulator to provide an increase in actuation that is greater than an actuation of said pump alone.

* * * * *